United States Patent

Bertele

4,018,510

Apr. 19, 1977

[54] VARIFOCAL OBJECTIVE CONTAINING MOVABLE LENS COMPONENT OF POSITIVE REFRACTIVITY

[75] Inventor: Ludwig Bertele, Au, Switzerland

[73] Assignees: Ludwig Bertele; Jurgen Bertele, both of Au, Switzerland; part interest to each

[22] Filed: June 9, 1975

[21] Appl. No.: 585,360

[30] Foreign Application Priority Data

June 13, 1974 Switzerland .................. 8226/74

[52] U.S. Cl. ............................................ 350/184
[51] Int. Cl.² ...................................... G02B 15/14
[58] Field of Search ................................ 350/184

[56] References Cited

UNITED STATES PATENTS

| 3,580,662 | 5/1971 | Scholz | 350/184 |
| 3,597,048 | 8/1971 | Bertele | 350/184 |

*Primary Examiner*—John K. Corbin
*Assistant Examiner*—Conrad Clark
*Attorney, Agent, or Firm*—Werner W. Kleeman

[57] ABSTRACT

An objective of variable focal length affording an aperture ratio of about 1:1.0 to 1:1.4 for narrow film projectors and microscopes comprising at least six lens members separated by air spaces, characterized by the following construction and arrangement of the lens members:

a. a first lens member confronting the longer conjugate or the projection screen, respectively, said first lens member having dispersing power and the surface thereof with the larger radius of curvature confronts the film or the shorter conjugate respectively;

b. a second displaceably arranged lens member having collective power and containing outer surfaces of approximately the same radii of curvature;

c. a third collecting lens member having differently curved outer surfaces, wherein the surface confronting the shorter conjugate or the film, respectively, possesses the larger radius of curvature and separated from the lens surface of the following fourth lens member by a small air space;

d. a fourth dispersing lens member composed of at least one collecting lens element and a dispersing lens element having a predetermined axial thickness, wherein the convex curved lens surface facing the longer conjugate possesses a larger radius of curvature than the radius of curvature of the concave curved surface confronting the shorter conjugate or the film, respectively;

e. a fifth lens member comprising a meniscus curved towards the shorter conjugate or the film respectively, said meniscus possessing an axial thickness which is smaller than one-half of the radius of curvature of the convex lens surface thereof facing the shorter conjugate or the film, respectively, and also smaller than the axial thickness of the fourth lens member; and f. a sixth lens member having collective power and possessing convex outer surfaces.

7 Claims, 3 Drawing Figures

VARIFOCAL OBJECTIVE CONTAINING MOVABLE LENS COMPONENT OF POSITIVE REFRACTIVITY

BACKGROUND AND SUMMARY OF THE INVENTION

The present invention relates to a new and improved construction of an objective possessing variable focal length with and aperture ratio of about 1:1.0 to 1:14.4 for narrow film projectors and microscopes comprising at least six lens members separated by air spaces or gaps.

The objective of this invention is an improvement upon the varifocal objective disclosed in my U.S. Pat. No. 3,466,113, granted Sept. 9, 1969. Experiments carried out on the objective constructions disclosed in the aforementioned U.S. patent have shown that with the aid of simple means, such as incorporating a lens member which faces towards the film or towards the shorter conjugate, completely new possibilities can be realized. It is from this basic concept that the present invention evolved.

DETAILED DESCRIPTION OF THE INVENTION

Figure 1:
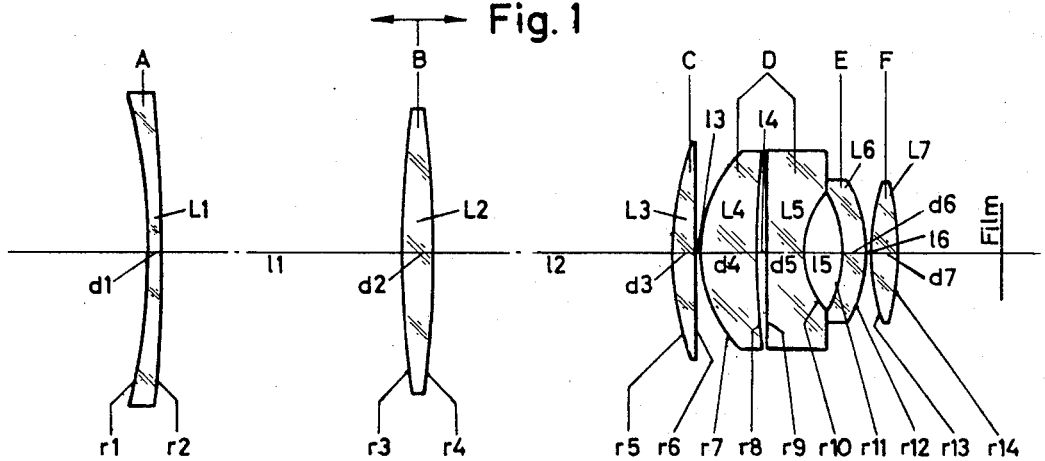

The invention is manifested by the following construction and arrangement of the lens members:

a. a first lens member confronting the longer conjugate or the projection screen, respectively, said first lens member having dispersing power and the surface thereof with the larger radius of curvature confronts the film or the shorter conjugate, respectively;

b. a second displaceably arranged lens member having collective power and containing outer surfaces of approximately the same radii of curvature;

c. a third collecting lens member having differently curved outer surfaces, whrein the surface confronting the shorter conjugate or the film, respectively, possesses the larger radius of curvature and separated from the lens surface of the following fourth lens member by a small air space;

d. a fourth dispersing lens member composed of at least one collecting lens element and a dispersing lens element having a predetermined axial thickness, wherein the convex curved lens surface facing the longer conjugate possesses a larger radius of curvture than the radius of curvature of the concave curved surface confronting the shorter conjugate or the film, respectively;

e. a fifth lens member comprising a meniscus curved towards the shorter conjugate or the film respectively, said meniscus possessing an axial thickness which is smaller than one-half of the radius of curvature of the convex lens surface thereof facing the shorter conjugate or the film, respectively, and also smaller than the axial thickness of the fourth lens member; and f. a sixth lens member having collective power and possessing convex outer surfaces.

Such type objective of simple construction is particularly suitable for the projection, but also with short focal length for use with microscopes. In contrast to the objective disclosed in my aforementined U.S. Pat. No. 3,466,113 it is possible to either increase the image quality or the aperture ratio. The letter is more important for the projection, since as a result thereof there can be projected images or pictures with adequate brightness. However, this is only possible if there is a coincidence of the guiding of the rays of the illumination system of a projector with the guiding of the rays of the inventive varifocal objective. The bundle of light rays which pass through the marginal portions of the film image possess an inclination to the optical axis determined by the illumination system. This bundle of light rays, upon passage through the objective, should be cut as little as possible, or, stated in another way, the pupil of the objective should be located at the position prescribed by the illumination system.

Apart from the increase of the aperture ratio the objective of the invention provides a further advantage in that the position or location of the aforementioned pupil can be accommodated over a large range to the requirements of the provided illumination system by means of a suitable selection of the axial thickness of the meniscus-shaped fifth lens member incorporated into the objective. Of course, the possible size of the aforementioned lens thickness is limited by other factors and specifically, especially by the correction possiblities of the image errors. Experiments have shown that this thickness can be increased to such an extent until it approximately corresponds to that of the fourth lens member.

In the description to follow there will be discussed seven examples based upon the constructions of objectives shown in FIGS. 1, 2 and 3. In these figures for projection purposes the film is arranged at the right-hand side of the inventive objective, which in the case of use of the objectives for microscopic purposes corresponds to the shorter conjugate. At the left-hand side of such Figures there is provided for projection purposes a non-illustrated projection screen, which in the case of microscopic purposes corresponds to the side of the longer conjugate. In these FIGS. 1, 2 and 3 there are used as a matter of convenience the following symbols to denote the following:

Reference characters A,B,C,D,E, and F designate the individual lens members;

Reference character $L$ designates the individual lenses or lens elements;

Reference character $r$ designates the different radii of curvature of the lenses;

Reference character $d$ designates the different thicknesses of the lenses;

Reference character $l$ designates the different air spaces or air gaps;

Reference character $n$ designates the refractive index for the helium line; and Reference character $v$ designates the Abbe number.

Examples 1 to 5 relate to inventive varifocal objective with a focal length range of 15 to 25 millimeters with an aperture ratio of 1:1.1 for 8 millimeter film projectors. The individual lenses L4 and L5 forming the lens member D are separated from one another by a small air space 14.

Examples 6 and 7 relate to varifocal objectives of the invention with a focal length range of 32 to 65 millimmeter with an aperture ratio of 1:1.3 for 16 millimeter film projectors with improved image quality. In Example 6 (FIG. 2) the individual lenses L4 and L5 forming the lens member D are cemented to one another in contrast to Example 7 (FIG. 3). Lens member F is a cemented lens member in Example 7.

It is within the framework of the invention if there are incorporated cemented surfaces in the individual lens members or if the same are further sub-divided. The Table given hereinafter in each instance shows in the intermediate position of the displaceable lens member B the influence of the thickness of the lens member E upon the position of the pupil with respect to the thickness of the lens member D. In such Table reference character t4 denotes the thickness of the lens member D, reference character t5 that of the lens member E. The position of the pupil is denoted by the distance P measured from the film plane in the direction of the objective.

TABLE

| Example | 1 | 2 | 3 | 4 | 5 | 6 | 7 |
|---|---|---|---|---|---|---|---|
| t4 | 7.87 | 7.87 | 7.87 | 7.6 | 7.3 | 19.5 | 18.75 |
| t5 | 0.5 | 1.6 | 2.5 | 5.0 | 7.5 | 4.5 | 5.0 |
| p | 39.4 | 39 | 37 | 58 | 280 | 63 | 74 |

In the above Table and the following Examples all linear measurements are given in millimeters.

Example 1 ( FIG. 1 )

| | | | $n_d$ | $v_d$ |
|---|---|---|---|---|
| $L_1$ | $r_1 = -45.98$ | $d_1 = 1.0$ | 1.53172 | 48.8 |
| | $r_2 = -127.43$ | $l_1 = 0.3 - 38.5$ | | |
| $L_2$ | $r_3 = +95.0$ | $d_2 = 2.6$ | 1.62041 | 60.3 |
| | $r_4 = -95.0$ | $l_2 = 38.5 - 0.3$ | | |
| $L_3$ | $r_5 = +26.0$ | $d_3 = 2.0$ | 1.69100 | 54.7 |
| | $r_6 = +260.0$ | $l_3 = 0.1$ | | |
| $L_4$ | $r_7 = +10.8$ | $d_4 = 4.4$ | 1.64050 | 60.1 |
| | $r_8 = +78.0$ | $l_4 = 0.47$ | | |
| $L_5$ | $r_9 = \infty$ | $d_5 = 3.0$ | 1.72825 | 28.4 |
| | $r_{10} = +6.97$ | $l_5 = 4.5$ | | |
| $L_6$ | $r_{11} = -8.18$ | $d_6 = 0.5$ | 1.69100 | 54.7 |
| | $r_{12} = -8.80$ | $l_6 = 0.1$ | | |
| $L_7$ | $r_{13} = +23.0$ | $d_7 = 2.2$ | 1.72875 | 54.2 |
| | $r_{14} = -19.7$ | | | |

Example 2 (FIG. 1)

| | | | $n_d$ | $v_d$ |
|---|---|---|---|---|
| $L_1$ | $r_1 = -45.98$ | $d_1 = 1.0$ | 1.53172 | 48.8 |
| | $r_2 = -127.43$ | $l_1 = 0.3 - 38.5$ | | |
| $L_2$ | $r_3 = +95.0$ | $d_2 = 2.6$ | 1.62041 | 60.3 |
| | $r_4 = -95.0$ | $l_2 = 38.5 - 0.3$ | | |
| $L_3$ | $r_5 = +2.53$ | $d_3 = 2.0$ | 1.69100 | 54.7 |
| | $r_6 = +260.0$ | $l_3 = 0.1$ | | |
| $L_4$ | $r_7 = +11.1$ | $d_4 = 4.4$ | 1.64050 | 60.1 |
| | $r_8 = +78.0$ | $l_4 = 0.47$ | | |
| $L_5$ | $r_9 = -400.0$ | $d_5 = 3.0$ | 1.72825 | 28.4 |
| | $r_{10} = +7.13$ | $l_5 = 3.2$ | | |
| $L_6$ | $r_{11} = -9.54$ | $d_6 = 1.6$ | 1.69100 | 54.7 |
| | $r_{12} = -10.57$ | $l_6 = 0.1$ | | |
| $L_7$ | $r_{13} = +21.0$ | $d_7 = 2.2$ | 1.69100 | 54.7 |
| | $r_{14} = -21.0$ | | | |

Example 3 ( FIG. 1 )

| | | | $n_d$ | $v_d$ |
|---|---|---|---|---|
| $L_1$ | $r_1 = -45.98$ | $d_1 = 1.0$ | 1.53172 | 48.8 |
| | $r_2 = -127.43$ | $l_1 = 0.3 - 38.5$ | | |
| $L_2$ | $r_3 = +95.0$ | $d_2 = 2.6$ | 1.62041 | 60.3 |
| | $r_4 = -95.0$ | $l_2 = 38.5 - 0.3$ | | |
| $L_3$ | $r_5 = +25.3$ | $d_3 = 2.0$ | 1.69100 | 54.7 |
| | $r_6 = +260.0$ | $l_3 = 0.1$ | | |
| $L_4$ | $r_7 = +11.1$ | $d_4 = 4.4$ | 1.64050 | 60.1 |
| | $r_8 = +78.0$ | $l_4 = 0.47$ | | |
| $L_5$ | $r_9 = -400.0$ | $d_5 = 3.0$ | 1.72825 | 28.4 |
| | $r_{10} = +7.195$ | $l_5 = 2.5$ | | |
| $L_6$ | $r_{11} = -12.3$ | $d_6 = 2.5$ | 1.69100 | 54.7 |
| | $r_{12} = -14.5$ | $l_6 = 0.1$ | | |
| $L_7$ | $r_{13} = +21.65$ | $d_7 = 2.2$ | 1.72875 | 54.2 |
| | $r_{14} = -22.65$ | | | |

Example 4 ( FIG. 1 )

| | | | $n_d$ | $v_d$ |
|---|---|---|---|---|
| $L_1$ | $r_1 = -47.5$ | $d_1 = 0.8$ | 1.53172 | 48.8 |
| | $r_2 = -131.4$ | $l_1 = 0.3 - 38.5$ | | |
| $L_2$ | $r_3 = +95.0$ | $d_2 = 2.6$ | 1.62041 | 60.3 |
| | $r_4 = -95.0$ | $l_2 = 38.5 - 0.3$ | | |
| $L_3$ | $r_5 = +25.4$ | $d_3 = 2.0$ | 1.69100 | 54.7 |
| | $r_6 = +310.0$ | $l_3 = 0.1$ | | |
| $L_4$ | $r_7 = +11.4$ | $d_4 = 5.0$ | 1.67790 | 55.2 |
| | $r_8 = +78.0$ | $l_4 = 0.6$ | | |
| $L_5$ | $r_9 = -200.0$ | $d_5 = 2.0$ | 1.72825 | 28.4 |
| | $r_{10} = +7.21$ | $l_5 = 2.1$ | | |
| $L_6$ | $r_{11} = -20.0$ | $d_6 = 5.0$ | 1.69100 | 54.7 |
| | $r_{12} = -22.0$ | $l_6 = 0.1$ | | |
| $L_7$ | $r_{13} = +19.4$ | $d_7 = 2.2$ | 1.69680 | 56.2 |
| | $r_{14} = -24.5$ | | | |

Example 5 ( FIG. 1 )

| | | | $n_d$ | $v_d$ |
|---|---|---|---|---|
| $L_1$ | $r_1 = -49.0$ | $d_1 = 0.8$ | 1.53088 | 51.1 |
| | $r_2 = -136.0$ | $l_1 = 0.3 - 38.5$ | | |
| $L_2$ | $r_3 = +95.0$ | $d_2 = 2.6$ | 1.62041 | 60.3 |
| | $r_4 = -95.0$ | $l_2 = 38.5 - 0.3$ | | |
| $L_3$ | $r_5 = +25.2$ | $d_3 = 2.0$ | 1.69100 | 54.7 |
| | $r_6 = +900.0$ | $l_3 = 0.1$ | | |
| | $r_7 = +11.92$ | | | |

Example 5 ( FIG. 1 )-continued

|  |  |  | $n_d$ | $v_d$ |
|---|---|---|---|---|
| $L_4$ | $r_8 = +78.0$ | $d_4 = 5.0$ | 1.69100 | 54.7 |
|  | $r_9 = -150.0$ | $l_4 = 0.6$ |  |  |
| $L_5$ | $r_{10} = +7.3$ | $d_5 = 1.7$ | 1.72825 | 28.4 |
|  | $r_{11} = -25.2$ | $l_5 = 2.0$ |  |  |
| $L_6$ | $r_{12} = -23.5$ | $d_6 = 7.5$ | 1.62041 | 60.3 |
|  | $r_{13} = +19.0$ | $l_6 = 0.1$ |  |  |
| $L_7$ | $r_{14} = -24.8$ | $d_7 = 1.9$ | 1.69680 | 56.2 |

Figure 2:
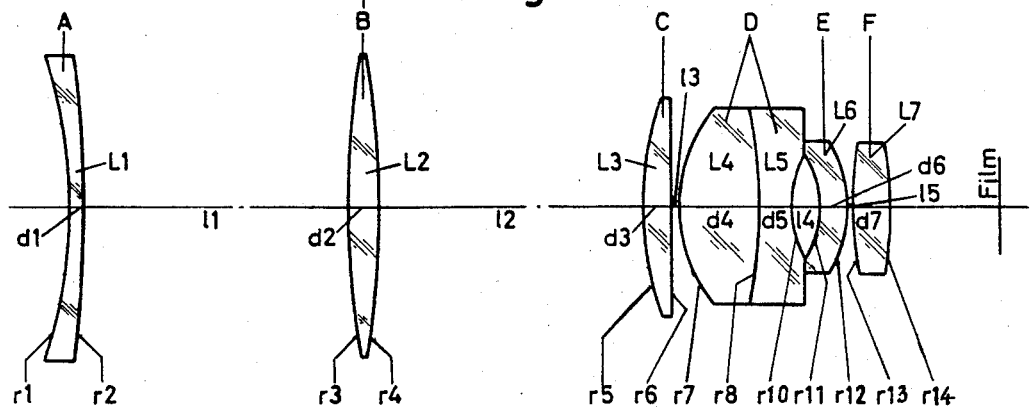

Example 6 ( FIG. 2 )

|  |  |  | $n_d$ | $v$ |
|---|---|---|---|---|
| $L_1$ | $r_1 = -78.29$ | $d_1 = 2.2$ | 1.57501 | 41.5 |
|  | $r_2 = -191.2$ | $l_1 = 0.8 - 86.9$ |  |  |
| $L_2$ | $r_3 = -164.4$ | $d_2 = 5.0$ | 1.62041 | 60.3 |
|  | $r_4 = -164.4$ | $l_2 = 87.1 - 0.3$ |  |  |
| $L_3$ | $r_5 = +57.0$ | $d_3 = 4.0$ | 1.62041 | 60.3 |
|  | $r_6 = \infty$ | $l_3 = 0.3$ |  |  |
| $L_4$ | $r_7 = +24.81$ | $d_4 = 13.5$ | 1.58904 | 53.0 |
|  | $r_8 = -76.0$ |  |  |  |
| $L_5$ | $r_{10} = +15.76$ | $d_5 = 6.0$ | 1.75693 | 27.6 |
|  | $r_{11} = -18.62$ | $l_4 = 4.5$ |  |  |
| $L_6$ | $r_{12} = -21.40$ | $d_6 = 4.5$ | 1.62000 | 36.4 |
|  | $r_{13} = +40.0$ | $l_5 = 0.2$ |  |  |
| $L_7$ | $r_{14} = -56.0$ | $d_7 = 6.0$ | 1.69100 | 54.7 |

Figure 3:
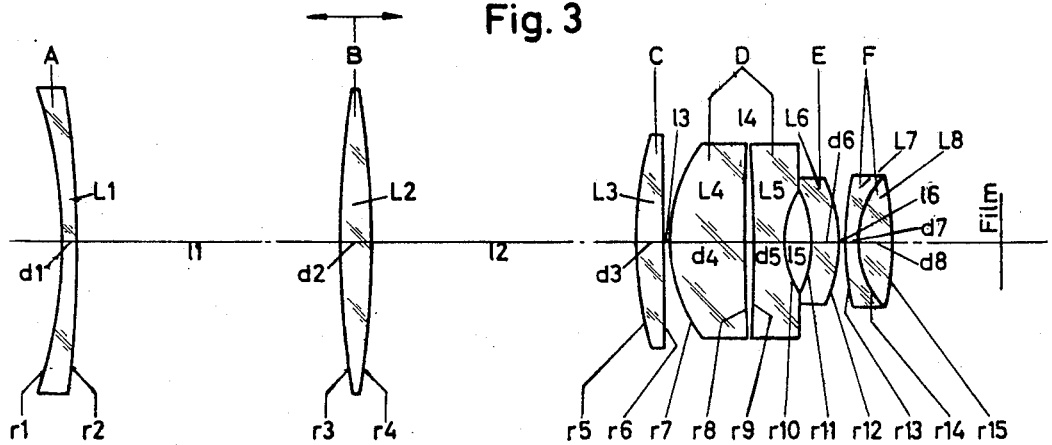

Example 7 ( FIG. 3 )

|  |  |  | $n_d$ | $v_d$ |
|---|---|---|---|---|
| $L_1$ | $r_1 = -78.29$ | $d_1 = 2.2$ | 1.57501 | 41.5 |
|  | $r_2 = -191.20$ | $l_1 = 0.5 - 86.9$ |  |  |
| $L_2$ | $r_3 = +164.4$ | $d_2 = 5.0$ | 1.62041 | 60.3 |
|  | $r_4 = -164.4$ | $l_2 = 87.1 - 0.3$ |  |  |
| $L_3$ | $r_5 = +57.0$ | $d_3 = 4.8$ | 1.62041 | 60.3 |
|  | $r_6 = \infty$ | $l_3 = 0.3$ |  |  |
| $L_4$ | $r_7 = +26.10$ | $d_4 = 13.0$ | 1.62041 | 60.3 |
|  | $r_8 = +360.0$ | $l_4 = 0.75$ |  |  |
| $L_5$ | $r_9 = -306.13$ | $d_5 = 5.0$ | 1.72825 | 28.4 |
|  | $r_{10} = +15.708$ | $l_4 = 4.5$ |  |  |
| $L_6$ | $r_{11} = -18.80$ | $d_6 = 5.0$ | 1.62000 | 36.4 |
|  | $r_{12} = -21.40$ | $l_6 = 0.20$ |  |  |
| $L_7$ | $r_{13} = +56.0$ | $d_7 = 2.0$ | 1.65224 | 44.9 |
|  | $r_{14} = +15.0$ |  |  |  |
| $L_8$ | $r_{15} = -50.95$ | $d_8 = 6.0$ | 1.69100 | 54.7 |

While there is shown and described present preferred embodiments of the invention, it is to be distinctly understood that the invention is not limited thereto, but may be otherwise variously embodied and practiced within the scope of the following claims. Accordingly, What is claimed is:

1. An objective of variable focal length affording an aperture ratio of about 1:1.0 to 1:1.4 for narrow film projectors and microscopes comprising at least six lens members separated by air spaces and having at least seven lens elements, charcterized by the following construction and arrangement of the lens members:
    a. a first lens member confronting the longer conjugate, said first lens member having dispersing power, the surface of said first lens member having the larger radius of curvature confronting the shorter conjugate;
    b. a second displaceably arranged lens member having collective power and having outer surfaces of approximately the same radii of curvature;
    c. a third collecting lens member having differently curved outer surfaces, the surface confronting the shorter conjugate having the larger radius of curvature, said third collecting lens member being separated from the lens surface of a following fourth lens member by a small air space;
    d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;
    e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member: and
    f. a sixth lens member having collective power and having convex outer surfaces: and

|  |  |  | $n_d$ | $V_d$ |
|---|---|---|---|---|
| $L_1$ | $r_1 = -45.98$ | $d_1 = 1.0$ | 1.53172 | 48.8 |
|  | $r_2 = -127.43$ | $l_1 = 0.3 - 38.5$ |  |  |
| $L_2$ | $r_3 = +95.0$ | $d_2 = 2.6$ | 1.62041 | 60.3 |
|  | $r_4 = -95.0$ | $l_2 = 38.5 - 0.3$ |  |  |
| $L_3$ | $r_5 = +26.0$ | $d_3 = 2.0$ | 1.69100 | 54.7 |
|  | $r_6 = +260.0$ | $l_3 = 0.1$ |  |  |
| $L_4$ | $r_7 = +10.8$ | $d_4 = 4.4$ | 1.64050 | 60.1 |
|  | $r_8 = +78.0$ | $l_4 = 0.47$ |  |  |
| $L_5$ | $r_9 = \infty$ | $d_5 = 3.0$ | 1.72825 | 28.4 |
|  | $r_{10} = +6.97$ | $l_5 = 4.5$ |  |  |
| $L_6$ | $r_{11} = -8.18$ | $d_6 = 0.5$ | 1.69100 | 54.7 |
|  | $r_{12} = -8.80$ | $l_6 = 0.1$ |  |  |
| $L_7$ | $r_{13} = +23.0$ | $d_7 = 2.2$ | 1.72875 | 54.2 |
|  | $r_{14} = -19.7$ |  |  |  | wherein the symbol L designates the individual lens elements of the lens members; the symbol $r$ designates the different radii of curvature of the lens elements; the symbol $d$ designates the different thickness of the lens elements the symbol $l$ designates the different air spaces; the symbol $n_d$ designates the refractive index for the helium line; and the symbol $v_d$ designates the Abbe number.

2. An objective of variable focal length affording an aperture ratio of about 1:1.0 to 1:1.4 for narrow film projectors and microscopes comprising at least six lens members separated by air space and having at least seven lens elements, characterized by the following construction and arrangement of the lens members:
  a. a first lens member confronting the longer conjugate, said first lens member having dispersing power, the surface of said first lens member having the larger radius of curvature confronting the shorter conjugate;
  b. a second displaceably arranged lens member having collective power and having outer surfaces of approximately the same radii of curvature;
  c. a third collecting lens member having differently curved outer surfaces, the surface confronting the shorter conjugate having the larger radius of curvature, said third collecting lens member being separated from the lens surface of a following fourth lens member by a small air space;
  d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;
  e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member; and
  f. a sixth lens member having collective power and having convex outer surfaces, and

| | | | $n_d$ | $v_d$ |
|---|---|---|---|---|
| $L_1$ | $r_1 = -45.98$ | | | |
| | $r_2 = -127.43$ | $d_1 = 1.0$ | 1.53172 | 48.8 |
| | | $l_1 = 0.3 - 38.5$ | | |
| | $r_3 = +95.0$ | | | |
| $L_2$ | | $d_2 = 2.6$ | 1.62041 | 60.3 |
| | $r_4 = -95.0$ | | | |
| | | $l_2 = 38.5 - 0.3$ | | |
| | $r_5 = +25.3$ | | | |
| $L_3$ | | $d_3 = 2.0$ | 1.69100 | 54.7 |
| | $r_6 = +260.0$ | | | |
| | | $l_3 = 0.1$ | | |
| | $r_7 = +11.1$ | | | |
| $L_4$ | | $d_4 = 4.4$ | 1.64050 | 60.1 |
| | $r_8 = +78.0$ | | | |
| | | $l_4 = 0.47$ | | |
| | $r_9 = -400.0$ | | | |
| $L_5$ | | $d_5 = 3.0$ | 1.72825 | 28.4 |
| | $r_{10} = +7.13$ | | | |
| | | $l_5 = 3.2$ | | |
| | $r_{11} = -9.54$ | | | |
| $L_6$ | | $d_6 = 1.6$ | 1.69100 | 54.7 |
| | $r_{12} = -10.57$ | | | |
| | | $l_6 = 0.1$ | | |

-continued

| | | | $n_d$ | $v_d$ |
|---|---|---|---|---|
| | $r_{13} = +21.0$ | | | |
| $L_7$ | | $d_7 = 2.2$ | 1.69100 | 54.7 |
| | $r_{14} = -21.0$ | | | | wherein the symbol L designates the individual lens elements of the lens members; the symbol $r$ designates the different radii of curvature of the lens elements; the symbol $d$ designates the different thickness of the lens elements; the symbol $l$ designates the different air spaces; the symbol $n_d$ designates the refractive index for the helium line; and the symbol $v_d$ designates the Abbe number.

3. An objective of variable focal length affording an aperture ratio of about 1:1.0 to 1:1.4 for narrow film projectors and microscopes comprising at least six lens members separated by air spaces and having at least seven lens elements, characterized by the following construction and arrangement of the lens members:
  a. a first lens member confronting the longer conjugate, said first lens member having dispersing power, the surface of said first lens member having the larger radius of curvature confronting the shorter conjugate;
  b. a second displaceably arranged lens member having collective power and having outer surfaces of approximately the same radii of curvature;
  c. a third collecting lens member having differently curved outer surfaces, the surface confronting the shorter conjugate having the larger radius of curvature, said third collecting lens member being separated from the lens surface of a following fourth lens member by a small air space;
  d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;
  e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member; and
  f. a sixth lens member having collective power and having convex outer surfaces; and

| | | | $n_d$ | $v_d$ |
|---|---|---|---|---|
| $L_1$ | $r_1 = -45.98$ | | | |
| | $r_2 = -127.43$ | $d_1 = 1.0$ | 1.53172 | 48.8 |
| | | $l_1 = 0.3 - 38.5$ | | |
| | $r_3 = +95.0$ | | | |
| $L_2$ | | $d_2 = 2.6$ | 1.62041 | 60.3 |
| | $r_4 = -95.0$ | | | |
| | | $l_2 = 38.5 - 0.3$ | | |
| | $r_5 = +25.3$ | | | |
| $L_3$ | | $d_3 = 2.0$ | 1.69100 | 54.7 |
| | $r_6 = +260.0$ | | | |
| | | $l_3 = 0.1$ | | |
| | $r_7 = +11.1$ | | | |
| $L_4$ | | $d_4 = 4.4$ | 1.64050 | 60.1 |
| | $r_8 = +78.0$ | | | |

-continued

| | | | $n_d$ | $v_d$ |
|---|---|---|---|---|
| | $r_9 = -400.0$ | $l_4 = 0.47$ | | |
| $L_5$ | | $d_5 = 3.0$ | 1.72825 | 28.4 |
| | $r_{10} = +7.195$ | | | |
| | $r_{11} = -12.3$ | $l_5 = 2.5$ | | |
| $L_6$ | | $d_6 = 2.5$ | 1.69100 | 54.7 |
| | $r_{12} = -14.5$ | | | |
| | $r_{13} = +21.65$ | $l_6 = 0.1$ | | |
| $L_7$ | | $d_7 = 2.2$ | 1.72875 | 54.2 |
| | $r_{14} = -22.65$ | | | | wherein the symbol L designates the individual lens elements of the lens members; the symbol $r$ designates the different radii of curvature of the lens elements; the symbol $d$ designates the different thicknesses of the lens elements; the symbol $l$ designates the different air spaces; the symbol $n_d$ designates the refractive index for the helium line; and the symbol $v_d$ designates the Abbe number.

4. An objective of variable focal length affording an aperture ratio of about 1:1.0 to 1:1.4 for narrow film projectors and microscopes comprising at least six lens members separated by air spaces and having at least seven lens elements, characterized by the following construction and arrangement of the lens members:
   a. a first lens member confronting the longer conjugate, said first lens member having dispersing power, the surface of said first lens member having the larger radius of curvature confronting the shorter conjugate;
   b. a second displaceably arranged lens member having collective power and having outer surfaces of approximately the same radii of curvature;
   c. a third collecting lens member having differently curved outer surfaces, the surface confronting the shorter conjugate having the larger radius of curvature, said third collecting lens member being separated from the lens surface of a following fourth lens member by a small air space;
   d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;
   e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member; and
   f. a sixth lens member having collective power and having convex outer surfaces; and

| | | | $n_d$ | $v_d$ |
|---|---|---|---|---|
| | $r_1 = -47.5$ | | | |
| $L_1$ | | $d_1 = 0.8$ | 1.53172 | 48.8 |
| | $r_2 = -131.4$ | | | |
| | | $l_1 = 0.3 - 38.5$ | | |
| | $r_3 = +95.0$ | | | |
| $L_2$ | | $d_2 = 2.6$ | 1.62041 | 60.3 |

| | | | $n_d$ | $v_d$ |
|---|---|---|---|---|
| | $r_4 = -95.0$ | | | |
| | | $l_2 = 38.5 - 0.3$ | | |
| | $r_5 = +25.4$ | | | |
| $L_3$ | | $d_3 = 2.0$ | 1.69100 | 54.7 |
| | $r_6 = +310.0$ | | | |
| | | $l_3 = 0.1$ | | |
| | $r_7 = +11.4$ | | | |
| $L_4$ | | $d_4 = 5.0$ | 1.67790 | 55.2 |
| | $r_8 = +78.0$ | | | |
| | | $l_4 = 0.6$ | | |
| | $r_9 = -200.0$ | | | |
| $L_5$ | | $d_5 = 2.0$ | 1.72825 | 28.4 |
| | $r_{10} = +7.21$ | | | |
| | | $l_5 = 2.1$ | | |
| | $r_{11} = -20.0$ | | | |
| $L_6$ | | $d_6 = 5.0$ | 1.69100 | 54.7 |
| | $r_{12} = -22.0$ | | | |
| | | $l_6 = 0.1$ | | |
| | $r_{13} = +19.4$ | | | |
| $L_7$ | | $d_7 = 2.2$ | 1.69680 | 56.2 |
| | $r_{14} = -24.5$ | | | | wherein the symbol L designates the individual lens elements of the lens members; the symbol $r$ designates the different radii of curvature of the lens elements; the symbol $d$ designates the different thicknesses of the lens elements; the symbol $l$ designates the different air spaces; the symbol $n_d$ designates the refractive index for the helium line; and the symbol $v_d$ designates the Abbe number.

5. An objective of variable focal length affording an aperture ratio of about 1:1.0 to 1:1.4 for narrow film projectors and microscopes comprising at least six lens members separated by air spaces and having at least seven lens elements, characterized by the following construction and arrangement of the lens members:
   a. a first lens member confronting the longer conjugate, said first lens member having dispersing power, the surface of said first lens member having the larger radius of curvature confronting the shorter conjugate;
   b. a second displaceably arranged lens member having collective power and having outer surfaces of approximately the same radii of curvature;
   c. a third collecting lens member having differently curved outer surfaces, the surface confronting the shorter conjugate having the larger radius of curvature, said third collecting lens member being separated from the lens surface of a following fourth lens member by a small air space;
   d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;
   e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member; and f. a sixth lens member having collective power and having convex outer surfaces; and

|  |  |  | $n_d$ | $v_d$ |
|---|---|---|---|---|
| $L_1$ | $r_1 = -49.0$ | $d_1 = 0.8$ | 1.53088 | 51.1 |
|  | $r_2 = -136.0$ |  |  |  |
|  |  | $l_1 = 0.3 - 38.5$ |  |  |
| $L_2$ | $r_3 = +95.0$ | $d_2 = 2.6$ | 1.62041 | 60.3 |
|  | $r_4 = -95.0$ |  |  |  |
|  |  | $l_2 = 38.5 - 0.3$ |  |  |
| $L_3$ | $r_5 = +25.2$ | $d_3 = 2.0$ | 1.69100 | 54.7 |
|  | $r_6 = +900.0$ |  |  |  |
|  |  | $l_3 = 0.1$ |  |  |
| $L_4$ | $r_7 = +11.92$ | $d_4 = 5.0$ | 1.69100 | 54.7 |
|  | $r_8 = +78.0$ |  |  |  |
|  |  | $l_4 = 0.6$ |  |  |
| $L_5$ | $r_9 = -150.0$ | $d_5 = 1.7$ | 1.72825 | 28.4 |
|  | $r_{10} = +7.3$ |  |  |  |
|  |  | $l_5 = 2.0$ |  |  |
| $L_6$ | $r_{11} = -25.2$ | $d_6 = 7.5$ | 1.62041 | 60.3 |
|  | $r_{12} = -23.5$ |  |  |  |
|  |  | $l_6 = 0.1$ |  |  |
| $L_7$ | $r_{13} = +19.0$ | $d_7 = 1.9$ | 1.69680 | 56.2 |
|  | $r_{14} = -24.8$ |  |  |  | wherein the symbol L designates the individual lens elements of the lens members; the symbol $r$ designates the different radii of curvature of the lens elements; the symbol $d$ designates the different thicknesses of the lens elements; the symbol $l$ designates the different air spaces; the symbol $n_d$ designates the refractive index for the helium line; and the symbol $v_d$ designates the Abbe number.

6. An objective of variable focal length affording an aperture ratio of about 1:1.0 to 1:1.4 for narrow film projectors and microscopes comprising at least six lens members separated by air spaces and having at least seven lens elements, characterized by the following construction and arrangement of the lens members:
   a. a first lens member confronting the longer conjugate, said first lens member having dispersing power, the surface of said first lens member having the larger radius of curvature confronting the shorter conjugate;
   b. a second displaceably arranged lens member having collective power an having outer surfaces of approximately the same radii of curvature;
   c. a third collecting lens member having differently curved outer surfaces, the surface confronting the shorter conjugate having the larger radius of curvature, said third collecting lens member being separated from the lens surface of a following fourth lens member by a small air space;
   d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;
   e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member; and
   f. a sixth lens member having collective power and having convex outer surfaces; and

|  |  |  | $n_d$ | $v_d$ |
|---|---|---|---|---|
| $L_1$ | $r_1 = -78.29$ | $d_1 = 2.2$ | 1.57501 | 41.5 |
|  | $r_2 = -191.2$ |  |  |  |
|  |  | $l_1 = 0.5 - 86.9$ |  |  |
| $L_2$ | $r_3 = +164.4$ | $d_2 = 5.0$ | 1.62041 | 60.3 |
|  | $r_4 = -164.4$ |  |  |  |
|  |  | $l_2 = 87.1 - 0.3$ |  |  |
| $L_3$ | $r_5 = +57.0$ | $d_3 = 4.8$ | 1.62041 | 60.3 |
|  | $r_6 = \infty$ |  |  |  |
|  |  | $l_3 = 0.3$ |  |  |
| $L_4$ | $r_7 = +24.81$ | $d_4 = 13.5$ | 1.58904 | 53.0 |
|  | $r_8 = -76.0$ |  |  |  |
| $L_5$ | $r_{10} = +15.76$ | $d_5 = 6.0$ | 1.75693 | 27.6 |
|  |  | $l_4 = 4.5$ |  |  |
|  | $r_{11} = -18.62$ |  |  |  |
| $L_6$ | $r_{12} = -21.40$ | $d_6 = 4.5$ | 1.62000 | 36.4 |
|  |  | $l_5 = 0.2$ |  |  |
| $L_7$ | $r_{13} = +48.0$ | $d_7 = 6.0$ | 1.69100 | 54.7 |
|  | $r_{14} = -56.0$ |  |  |  | wherein the symbol L designates the individual lens elements of the lens members; the symbol $r$ designates the different radii of curvature of the lens elements; the symbol $d$ designates the different thicknesses of the lens elements; the symbol $l$ designates the different air space; the symbol $n_d$ designates the refractive index for the helium line; and the symbol $v_d$ designates the Abbe number.

7. An objective of variable focal length affording an aperture ratio of about 1:1.0 to 1:1.4 for narrow film projectors and microscopes comprising at least six lens members separated by air spaces and having at least seven lens elements, characterized by the following construction an arrangement of the lens members:
   a. a first lense member confronting the longer conjugate, said first lens member having dispersing power, the surface of said first lens member having the larger radius of curvature confronting the shorter conjugate;
   b. a second displaceably arranged lens member having collective power and having outer surfaces of approximately the same radii of curvature;
   c. a third collecting lens member having differently curved outer surfaces, the surface confronting the shorter conjugate having the larger radius of curvature, said third collecting lens member being separated from the lens surface of a following fourth lens member by a small air space;
   d. a fourth dispersing lens member having an axial thickness and comprising at least one collecting lens element and a dispersing lens element, said collecting lens element having a convex curved lens surface confronting the longer conjugate, said dispersing lens element having a concave curved surface confronting the shorter conjugate, the convex curved lens surface of the collecting lens member having a larger radius of curvature than the radius of curvature of the concave curved surface confronting the shorter conjugate;

e. a fifth lens member comprising a meniscus convex to the shorter conjugate, said meniscus possessing an axial thickness which is smaller than one-half of the radius of curvature of the convex lens surface thereof confronting the shorter conjugate and also smaller than the axial thickness of the fourth lens member; and f. a sixth lens member having collective power and having convex outer surfaces; and

|  |  |  | $n_d$ | $v_d$ |
|---|---|---|---|---|
| $L_1$ | $r_1 = -78.29$ | $d_1 = 2.2$ | 1.57501 | 41.5 |
|  | $r_2 = -191.20$ | $l_1 = 0.5 - 86.9$ |  |  |
| $L_2$ | $r_3 = +164.4$ | $d_2 = 5.0$ | 1.62041 | 60.3 |
|  | $r_4 = -164.4$ | $l_2 = 87.1 - 0.3$ |  |  |
| $L_3$ | $r_5 = +57.0$ | $d_3 = 4.8$ | 1.62041 | 60.3 |
|  | $r_6 = \infty$ | $l_3 = 0.3$ |  |  |

-continued

|  |  |  | $n_d$ | $v_d$ |
|---|---|---|---|---|
| $L_4$ | $r_7 = +26.10$ | $d_4 = 13.0$ | 1.62041 | 60.3 |
|  | $r_8 = +360.0$ | $l_4 = 0.75$ |  |  |
| $L_5$ | $r_9 = -306.13$ | $d_5 = 5.0$ | 1.72825 | 28.4 |
|  | $r_{10} = +15.708$ | $l_5 = 4.5$ |  |  |
| $L_6$ | $r_{11} = -18.80$ | $d_6 = 5.0$ | 1.62000 | 36.4 |
|  | $r_{12} = -21.40$ | $l_6 = 0.20$ |  |  |
| $L_7$ | $r_{13} = +56.0$ | $d_7 = 2.0$ | 1.65224 | 44.9 |
|  | $r_{14} = +15.0$ |  |  |  |
| $L_8$ | $r_{15} = -50.95$ | $d_8 = 6.0$ | 1.69100 | 54.7 | wherein the symbol L designates the individual lens elements of the lens members; the symbol $r$ designates the different radii of curvature of the lens elements; the symbol $d$ designates the different thicknesses of the lens elements; the symbol $l$ designates the different air spaces; the symbol $n_d$ designates the refractive index for the helium line; and the symbol $v_d$ designates the Abbe number.

* * * * *